US012468590B2

United States Patent
Kwong et al.

(10) Patent No.: US 12,468,590 B2
(45) Date of Patent: *Nov. 11, 2025

(54) ADAPTIVE WEAR LEVELING FOR ENDURANCE COMPENSATION

(71) Applicant: Micron Technology, Inc., Boise, ID (US)

(72) Inventors: Charles See Yeung Kwong, Redwood City, CA (US); Seungjune Jeon, Santa Clara, CA (US); Wei Wang, Dublin, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,635

(22) Filed: May 23, 2024

(65) Prior Publication Data

US 2024/0320077 A1    Sep. 26, 2024

Related U.S. Application Data

(63) Continuation of application No. 17/858,731, filed on Jul. 6, 2022, now Pat. No. 12,026,042.

(60) Provisional application No. 63/347,919, filed on Jun. 1, 2022.

(51) Int. Cl.
*G06F 11/00* (2006.01)
*G06F 11/07* (2006.01)

(52) U.S. Cl.
CPC .......... *G06F 11/076* (2013.01); *G06F 11/008* (2013.01); *G06F 11/073* (2013.01); *G06F 2201/81* (2013.01); *G06F 2212/7211* (2013.01)

(58) Field of Classification Search
CPC .... G06F 11/076; G06F 11/008; G06F 11/073; G06F 12/0246
See application file for complete search history.

(56) References Cited

U.S. PATENT DOCUMENTS

| | | | |
|---|---|---|---|
| 9,329,797 B2 * | 5/2016 | Darragh | G06F 3/0679 |
| 9,442,662 B2 * | 9/2016 | Dancho | G11C 11/5628 |
| 9,710,376 B2 | 7/2017 | Baltar | |
| 10,275,310 B2 * | 4/2019 | B | G06F 11/108 |
| 10,282,111 B2 * | 5/2019 | Barndt | G06F 3/064 |
| 10,324,648 B1 | 6/2019 | Goss et al. | |
| 12,026,042 B2 * | 7/2024 | Kwong | G06F 11/073 |

(Continued)

OTHER PUBLICATIONS

Chen F H., et al., "PWL: A Progressive Wear Leveling to Minimize Data Migration Overheads for Nand Flash Devices," Design, Automation & Test in Europe Conference & Exhibition (DATE), Grenoble, France, 2015, pp. 1209-1212.

(Continued)

*Primary Examiner* — Philip Guyton
(74) *Attorney, Agent, or Firm* — Lowenstein Sandler LLP

(57) ABSTRACT

A first blocks of a set of blocks of a memory device is identified. A die on which the first block resides is identified among a plurality of dies of the memory device. A threshold value associated with the die is selected from a range associated with a projected reliability metric of the die. Responsive to determining that an endurance metric value associated with the die matches the threshold value, a program operation is performed with respect to a second block of the set of blocks.

20 Claims, 5 Drawing Sheets

(56) References Cited

U.S. PATENT DOCUMENTS

| | | |
|---|---|---|
| 2015/0213893 A1 | 7/2015 | Parker et al. |
| 2017/0123726 A1 | 5/2017 | Sinclair et al. |
| 2018/0267705 A1 | 9/2018 | Liu et al. |
| 2019/0391752 A1* | 12/2019 | Pletka ............... G06F 3/0616 |
| 2023/0307061 A1 | 9/2023 | Konishi et al. |
| 2024/0320077 A1* | 9/2024 | Kwong ............ G06F 11/076 |

OTHER PUBLICATIONS

Liao J., et al., "Adaptive Wear-Leveling in Flash-Based Memory," IEEE Computer Architecture Letters, 2015, vol. 14 (1), pp. 1-4.

Yang M C., et al., "Reducing Data Migration Overheads of Flash Wear Leveling in a Progressive Way," IEEE Transactions on Very Large Scale Integration (VLSI) Systems, May 2016, vol. 24(5), pp. 1808-1820.

* cited by examiner

Bin Assignment Table 202

| Bin | Bin Requirements | Dies | Avg. Skip Period |
|---|---|---|---|
| 1 | 12K | 3 - N | 0 |
| 2 | 10K | 1 | 6 |
| 3 | 8K | 0 | 3 |

Die Skip Table 204

| Die 0 | Die 1 | Die 2 | Die 3 | ... | Die N | Erase Count |
|---|---|---|---|---|---|---|
| Skip |  |  |  | ... |  | 1000 |
|  | Skip |  |  | ... |  | 1001 |
| Skip |  |  |  | ... |  | 1002 |
|  |  |  |  | ... |  | 1003 |
|  |  |  |  | ... |  | 1004 |
|  |  |  |  | ... |  | 1005 |
|  |  |  |  | ... |  | 1006 |
|  |  |  |  | ... |  | 1007 |
| Skip |  |  |  | ... |  | 1008 |
| Skip | Skip |  |  | ... |  | 1009 |
| Skip | Skip |  |  | ... |  | 1010 |
|  |  |  |  | ... |  | 1011 |
|  |  |  |  | ... |  | 1012 |
|  |  |  |  | ... |  | 1013 |
|  |  |  |  | ... |  | 1014 |
| Skip |  |  |  | ... |  | 1015 |
|  |  |  |  | ... |  | 1016 |
|  |  |  |  | ... |  | 1017 |

ADAPTIVE WEAR LEVELING FOR ENDURANCE COMPENSATION

REFERENCE TO RELATED APPLICATION

This application is a continuation of, and claims priority to, U.S. patent application Ser. No. 17/858,731, filed Jul. 6, 2022, titled "Adaptive Wear Leveling for Endurance Compensation," which claims the benefit under 35 U.S.C. § 119(e) of U.S. Provisional Patent Application No. 63/347,919, filed Jun. 1, 2022. The entire contents of both above-referenced applications are incorporated by reference herein.

TECHNICAL FIELD

Embodiments of the disclosure relate generally to memory sub-systems, and more specifically, relate to adaptive wear leveling for endurance compensation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates example data structures to implement adaptive wear leveling on sets of blocks, in accordance with some embodiments of the present disclosure.

DETAILED DESCRIPTION

Figure 1:
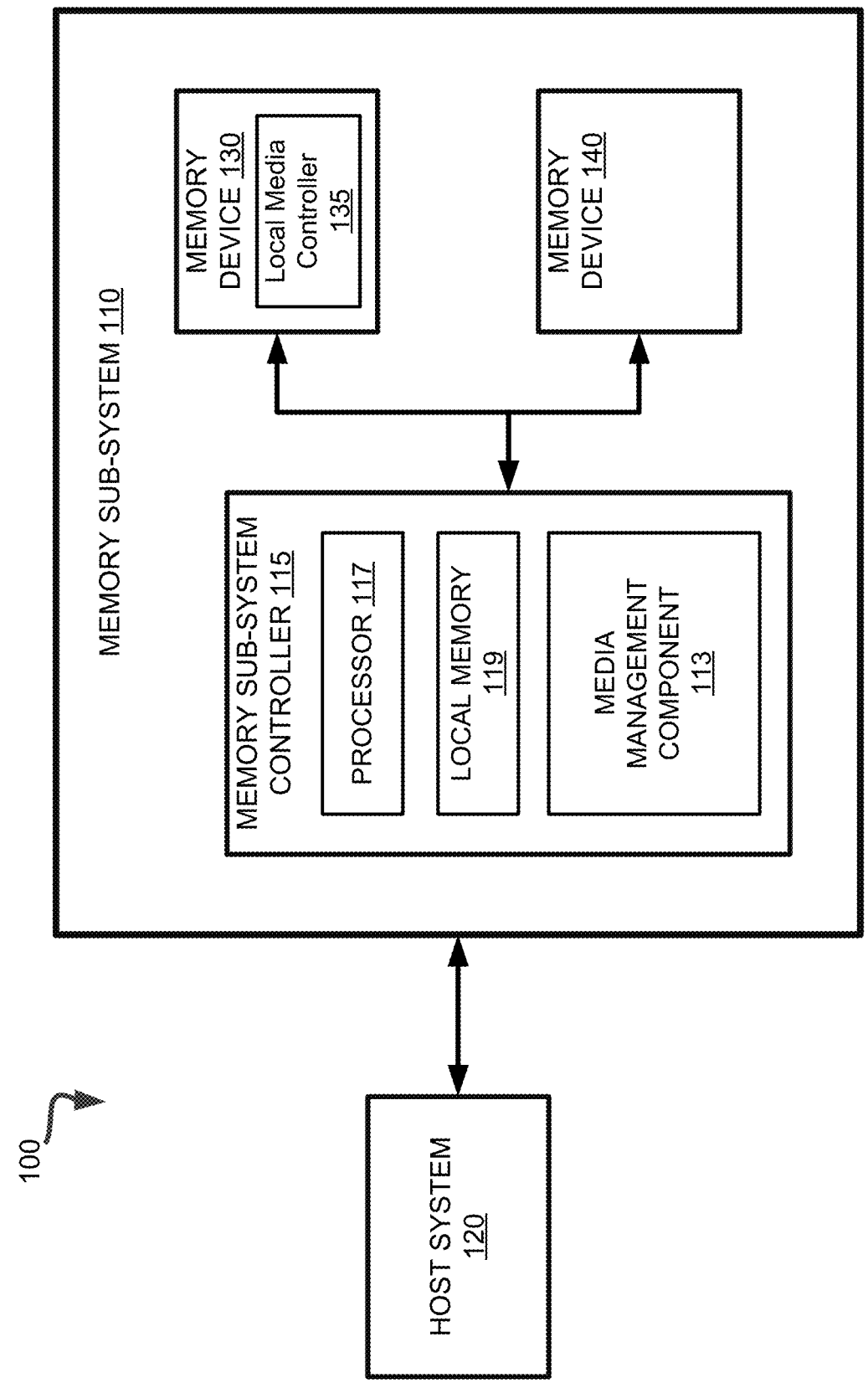
FIG. 1 illustrates an example computing system that includes a memory sub-system in accordance with some embodiments of the present disclosure.

Aspects of the present disclosure are directed to adaptive wear leveling for endurance compensation. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Individual segments, data units, or blocks of the memory device can be written to, read from, and/or erased a finite number of times before physical wear degrades the media. The health of the memory device can be represented as an endurance capability of the memory device, and/or the data retention capability of the memory device. An endurance capability of the memory device can be measured in the number of program erase cycles that the memory device can endure before it becomes unreliable. The data retention capability of the memory device is capability of retaining stored data over time. Data retention time is the period of time that the memory device can retain data, and is a function of program/erase cycles and temperature. A data retention capability of the memory device can be measured in changes to the raw bit error rate (RBER). A high RBER (e.g., a RBER that exceeds a threshold value) indicates a degrading data retention capability.

During manufacturing, a memory device can undergo testing to predict the endurance and/or data retention capability of the dies within the memory device. Thus, each die can be assigned a capability metric value that reflect statistics and analytics related to the manufacturing process of the die, performance by other dies manufactured under similar conditions, or any other metrics related to the manufacturing, inspection, testing, or performance of the die. In the production of some memory sub-systems, dies that do not meet certain capability metric value threshold values are discarded. That is, a memory device is built using only dies that meet certain predetermined capability metric threshold values. The dies that are not included in a memory device are not used. This practice impacts the overall yield of memory sub-systems, and increases costs due to the inability to use dies that do not meet minimum requirements.

Aspects of the present disclosure address the above and other deficiencies by providing a memory sub-system that incorporates low-capability dies by using adaptive wear leveling to ensure consistent endurance and data retention throughout the dies included in a memory device. A low-capability die is one that has a capability metric value that falls below the traditional minimum requirements. The capability metric can reflect the projected endurance of the die, and/or the projected data retention capability of the die. Wear leveling operations attempt to evenly distribute read, write, and erase operations performed on memory devices. Thus, the adaptive wear leveling operations implemented on the low-capability dies in a memory device evenly distribute the physical wear across the memory device.

The memory sub-system controller can classify the dies based on their respective capability metric values and assign each die to a respective capability bin based on the capability metric value of the die. For example, dies that have their respective capability metric values above a high threshold value can be assigned to capability bin 1, dies that have a capability metric value between the high threshold value and a low threshold value can be assigned to capability bin 2, and dies that have a capability metric value below the low threshold can be assigned to capability bin 3. Note that more than or fewer than three bins can be used. Since the capability metric for a particular die reflects a projected endurance and/or data retention for the die, the memory sub-system controller can determine to perform write operations with respect to the dies assigned to bin 3 less frequently than to the dies assigned to bins 1 and 2, and to write to the dies assigned to bin 2 less frequently than to the dies assigned to bin 1.

In embodiments, the memory sub-system controller can select a set of blocks (e.g., a superblock, a redundant array of independent NAND (RAIN) stripe) to program (i.e., to write to). Prior to writing to the set of blocks, the memory sub-system controller can erase the data stored on the set of blocks. The process of erasing and writing to a set of blocks can be referred to as a program/erase cycle (PEC). In order to implement the adaptive wear leveling scheme described herein, upon selecting the set of blocks to program, and prior to erasing the data stored on the set of the blocks, the memory sub-system controller can exclude certain blocks, e.g., blocks that reside on low-capability dies, from the set of blocks to be programmed. The memory sub-system controller can identify the block(s) that reside on low-capability dies by comparing the capability metric of the die to a threshold capability value. In embodiments, the threshold capability value can be the capability of the most capable dies in the memory device. In some embodiments, the memory sub-system controller can identify the block(s) that reside on low-capability dies by identifying which capability bin the dies are assigned to.

The memory sub-system controller can determine whether to exclude the block(s) residing on low-capability dies from the set of blocks. Excluding the block(s) residing on a low-capabilities dies from the set of blocks includes not erasing the data stored on the identified block(s), thus excluding the block(s) from the current PEC. Additionally or alternatively, the memory sub-system controller can exclude the block(s) by excluding the block(s) in XOR parity calculations for the redundancy scheme. In embodiments, the skipped block(s) can be treated as temporarily retired block (s), in which the memory sub-system controller temporarily updates the XOR parity location and/or metadata location of the block(s).

The memory sub-system controller can use randomized cycle thresholds to determine whether to exclude the block (s) residing on low-capability dies from the set of blocks. Each capability bin can have an associated average cycle threshold based on the relationship between the capability bin's capability metric and the highest capability metric. For example, dies that have a capability metric value above a high threshold value are assigned to bin 1, dies that have a capability metric above a middle threshold value and below the high threshold value are assigned to bin 2, and dies that have a capability metric value above a low threshold value and below the middle threshold value are assigned to bin 3. Because the dies assigned to bin 1 have the highest capability metric values, blocks residing on dies assigned to bin 1 will be not be skipped. The blocks residing on dies assigned to bin 2 will be skipped, on average, every x program/erase cycles, wherein x is based on the relationship between the middle threshold value and the high threshold value. Similarly, the blocks residing on dies assigned to bin 3 will be skipped, on average, every y program/erase cycles, wherein y is based on the relationship between the low threshold value and the high threshold value. For example, if the low threshold value is ⅔ that of the high threshold value (e.g., the low threshold value is 8 and the high threshold value is 12), then the blocks residing on dies assigned to bin 3 will be skipped, on average, ⅓ of the time (i.e., every third program/erase cycle). Thus, in this example, since blocks residing on dies assigned to bin 3 will be skipped, on average, every third program/erase cycle, the average cycle threshold for bin 3 is 3.

The memory sub-system controller can then determine a cycle threshold, based on the average cycle threshold, for each die in the capability bin. The cycle threshold can be a random number between the minimum value (e.g., once), and the maximum value (e.g., derived from the average cycle threshold). Choosing the cycle threshold between these minimum and maximum values ensures that the probability of a block residing on a low-capability die will be degraded at approximately the same rate as blocks residing on dies with the highest capability metric (i.e., the dies assigned to the highest capability bins). Using a random cycle threshold avoids a predictable skip pattern, thus increasing the lifespan of the memory device.

The memory sub-system controller can maintain a counter for each die in the memory device. The counter can begin at zero, and the memory sub-system controller can increment the counter value with each program/erase cycle performed on the die. Thus, upon selecting a set of blocks to program, for each die on which the blocks in the set of blocks reside, the memory sub-system controller can compare the counter values to the determined cycle threshold of the die. If the counter value matches the cycle threshold, the memory sub-system controller can exclude the blocks residing on that die from the set of blocks (i.e., not perform a PEC cycle on those blocks, exclude the blocks from XOR parity calculations, etc.). The memory sub-system controller can then reset the counter back to zero, and can determine an updated cycle threshold for the die. The updated cycle threshold can be a new random number between the minimum value (e.g., once), and the maximum value (e.g., derived from the average cycle threshold). If the counter value for the die does not match the cycle threshold, the memory sub-system controller can include the blocks residing on the die in the set of blocks, and can increment the counter value (e.g., by "1").

Advantages of the present disclosure include, but are not limited to, improved time-to-market procedures by utilizing more memory dies in the production of memory devices. Using lower capability dies results in fewer wasted dies, thus reducing the cost to produce memory devices. Additionally, using the adaptive wear leveling scheme described herein, the blocks residing on the lowest capability dies will be written to less frequently than the blocks residing on higher capability dies, resulting in all the dies in the memory device reaching the end-of-life at or around the same time. This can result in an increase in the overall lifetime of a memory sub-system and the prevention of premature failure of the memory sub-system by adaptively adjusting the predetermined cycle count by which media management operation are to be performed on the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a media management component 113 that can adapt the wear leveling performed on dies within a memory device 130, 140. In some embodiments, the memory sub-system controller 115 includes at least a portion of the media management component 113. In some embodiments, the media management component 113 is part of the host system 120, an application, or an operating system. In other embodiments, local media controller 135 includes at least a portion of media management component 113 and is configured to perform the functionality described herein.

The media management component 113 can adapt the wear leveling performed on dies with a memory device 130 by comparing the counter value of each die to a determined cycle threshold prior to performing a program/erase cycle on the blocks residing on the die. In embodiments, the media management component 113 can identify a set of blocks to program. The set of blocks can be, for example, a superblock or a RAIN stripe. A superblock is a set of data blocks that span multiple dies and are written in an interleaved fashion. A superblock can contain multiple data blocks from a single die, such as one per plane. Memory sub-systems may generally manage the erasure and programming of data on a superblock basis. In embodiments, the superblock can be implemented as part of a fault tolerant redundancy scheme (e.g., RAIN). A fault tolerant redundancy scheme can store host data in groups of pages, referred herein as fault tolerant stripes, such that each stripe includes a redundancy metadata page (e.g., a parity page), thus enabling for the data to be reconstructed if one of the pages of the stripe fails.

In order to program the set of blocks, the memory sub-system controller first erases the data stored on the set of blocks. Prior to erasing the set of blocks, the media management component 113 can determine whether to exclude any blocks from the set of blocks in order to provide consistent degradation among the dies in the memory device. That is, the media management component 113 can perform fewer program/erase cycles on the dies in the memory device that have a lower projected capability than on the dies in the memory device that have a higher projected capability.

The media management component 113 can identify a capability metric value for each die in the memory device 130. The capability metric value can reflect the projected endurance of the die, and/or the projected data retention capability of the die, for example. In embodiments, the capability metric can reflect other projected capability metric not listed here. The capability metric value can be determined during the manufacturing process of the die, and can reflect statistics and analytics related to the manufacturing process of the die, performance by other dies manufactured under similar conditions, or any other metrics related to the manufacturing, inspection, testing, or performance of the die. In embodiments, the media management component 113 can determine the capability metric value (or update the capability metric value) during operation of the memory sub-system. For instance, the media management component 113 can identify an error rate for a die (e.g., the raw bit error rate (RBER), and/or the codeword error rate (CWER)), and can determine a capability metric value that reflects the identified error rates for the die. The media management component 113 can determine the capability metric value during operation of the memory sub-system on a predetermined schedule (e.g., once every day, or once every 7 days), and/or in response to triggering event (e.g., upon determining that the error rate for a die has fallen below a threshold value).

The media management component 113 can assign each die in the memory device to a capability bin based on the identified capability metric value of the die. For example, the highest capability dies can be assigned to the lowest capability bin, and the lowest capability dies can be assigned to the highest capability bin. In order to compensate for including the lower capability dies in the memory device, the media management component 113 can occasionally exclude the blocks residing on lower capability dies from certain operations. To do so, upon identifying a set of blocks to program, the media management component 113 can determine whether any blocks in the set of blocks reside on a die that is assigned to a lower capability bin (i.e., a capability bin other than the highest capability bin). The media management component 113 can then determine whether to exclude the blocks residing in on lower capability dies from the identified set of blocks. The blocks residing in lower capability dies can be excluded based on a cycle threshold associated with the die. That is, the cycle threshold for the die determines how often a block residing on the die is excluded from the set of blocks.

To determine the cycle threshold for a die, the media management component 113 can first determine an average cycle threshold for each capability bin. The average cycle threshold represents the average number of times blocks residing on the dies assigned to the capability bin are to be excluded from certain operations. The average cycle threshold can be based on the ratio of the capability metric of the capability bin to the capability metric of the highest capability bin. The cycle threshold for a die can be a random number between a minimum value (e.g., once), and a maximum value (e.g., derived from the average cycle threshold). For example, the maximum value can be one less than twice the average cycle threshold. Using a random number between these two values ensures that the probable frequency with which a die is written to is suitable for the projected capability of the die. Thus, blocks residing on low capability dies will degrade at approximately the same rate as blocks residing on high capability dies. The cycle threshold and the average cycle threshold are further described with respect to FIG. 2.

When the media management component 113 excludes a block from the set of blocks, the data stored on the excluded block is not erased, and the memory sub-system controller does not write new data at the excluded block. Additionally or alternatively, the excluded block is not included in XOR parity calculations for the set of blocks. In embodiments, the media management component 113 can treat the excluded block as a temporarily retired block, for example by changing the XOR parity location and/or metadata location.

Further details with regards to the operations of the media management component 113 are described below.

FIG. 2 illustrates example data structures to implement adaptive wear leveling on sets of blocks, in accordance with some embodiments of the present disclosure. FIG. 2 illustrates a bin assignment table 202 and a die skip table 204. Bin assignment table 202 lists the capability bins 1-3, the corresponding bin capability requirements, and the dies assigned to each bin. Note that the number of capability bins is illustrated as three for illustrative purposes only; the dies of a memory device can be assigned to fewer or more capability bins. In embodiments, a die can be assigned to a bin by updating die metadata with a bin assignment. In some embodiments, the memory sub-system controller 115 can maintain a die assignment table 202. Die skip table 204 illustrates a list of the dies (die 0-N) in a memory device, e.g., memory device 130, and when the blocks residing on a particular die are skipped (i.e., excluded from a set of blocks). Each row in die skip table 204 represents a set of blocks, such as a superblock or a RAIN stripe. In embodiments, the memory sub-system controller 115 can maintain the die skip table 204. In some embodiments, tables 202 and/or 204 can be stored in persistent memory within the memory sub-system, for example in memory device 130. Tables 202 and/or 204 can be any data structure, such as an array, a linked list, a tree, etc. In embodiments, table 202 and/or 204 are provided for illustrative purposes only, and are not stored on a memory device 130 or on local memory 119.

The bin requirements in bin assignment table 202 reflect the projected endurance capability for each bin 1-3. The projected endurance capability can denote the number of program erase cycles (PEC) that the memory device can endure per day before it becomes unreliable. As illustrated in bin assignment table 202, the highest projected endurance capability is 12K PEC per day, the second highest projected endurance capability is 10K PEC per day, and the lowest projected endurance capability is 8K PEC per day. In some embodiments, the bin assignment table 202 can list the projected data retention capability for each bin, another projected capability metric, and/or a combination of projected capability metrics.

As illustrated in FIG. 2, dies with a projected endurance capability of 12K or higher are assigned to bin 1, dies with a projected endurance capability between 10K and 12K are assigned to bin 2, and dies with a projected endurance capability between 8K and 10K are assigned to bin 3. In this example, dies with a projected endurance capability less than 8K are not included in the memory device.

The media management component 113 can determine an average cycle threshold for each bin 1-3 in bin assignment table 202. The average cycle threshold represents the average number of times the blocks residing on a die will be excluded from a set of blocks. As illustrated in bin assignment table 202, the dies with the highest capabilities (i.e., dies assigned to bin 1), have an average cycle threshold of 0. Thus, the blocks residing on the dies with the highest capabilities will not be excluded from a set of blocks. For example, the blocks residing on dies with the highest capabilities will be included in every program/erase cycles. The average cycle threshold for bins 2 and 3 can be determined by comparing the projected capability metric of the highest bin (e.g., bin 1) to the projected capability metric of the corresponding bin. For example, for bin 2, the average cycle threshold can be calculated as: bin 1 requirements÷(bin 1 requirements-bin 2 requirements), i.e., 12÷(12−10) =12÷2=6. Thus, the blocks residing on dies assigned to bin 2 will be skipped, on average, every 6 program/erase cycles. Similarly, for bin 3, the average cycle threshold can be calculated as: bin 1 requirements÷(bin 1 requirements−bin 3 requirements), i.e., 12÷(12−8)=12÷4=3. Thus, the blocks residing on dies assigned to bin 3 will be skipped, on average, every 3 program/erase cycles.

However, to avoid a predictable and cyclical skipping of blocks, the dies are skipped according to a randomized cycle threshold. Thus, the media management component 113 can determine a randomized cycle threshold of each die assigned to a bins 2 and 3 (i.e., as illustrated in FIG. 2, for die 0 and die 1). The randomized cycle threshold is a random number between a minimum number and a maximum number. The minimum number can be 1, and the maximum number can be derived from the average cycle threshold. For example, the maximum number can be twice the average cycle threshold minus 1. That is, for dies assigned to bin 2, the randomized cycle threshold is a random number between 1 and 11 (i.e., 2×6−1=11). For dies assigned to bin 3, the randomized cycle threshold is a random number between 1 and 5 (i.e., 2×3−1=5). By using a randomized cycle threshold between 1 and twice the average cycle threshold minus 1, the probability that blocks residing on a lower capability die will be skipped in an unpredictable and random fashion, thus helping to prolong the health of the memory device.

The media management component 113 can maintain a counter for each die 0-die N. The counter can begin with a value of 0, and with each erase cycle, the media management component 113 can increment the counter by 1. In embodiments, the counter can be the program/erase cycle counter for the die. When selecting a set of blocks to program (e.g., stripe 206), the media management component 113 can compare the cycle threshold for each die in the stripe to the value of the counter for each die. For example, for die 0, the media management component 113 can compare the counter value for die 0 to the cycle threshold for die 0. As illustrated in FIG. 2, the media management component 113 determined that the counter for die 0 matches the cycle threshold for bin 3, and thus the blocks residing on die 0 are excluded from the stripe 206. Similarly, the media management component 113 can compare the counter value for die 1 to the cycle threshold for die 1. As illustrated in FIG. 2, the media management component 113 determined that the counter value for die 1 does not match the cycle threshold for bin 2, and thus the blocks residing on die 1 are included in stripe 206. The blocks residing on dies 2-N are included, since those blocks are of the highest capability.

Once the counter value for the die matches the cycle threshold, the media management component 113 can calculate a new cycle threshold for the die. For example, in response to determining that the cycle threshold for die 0 matches the counter value for die 0, the media management component 113 can exclude the blocks residing on die 0 from stripe 206, and the media management component 113 can calculate a new cycle threshold for die 0. The new cycle threshold for die 0 is a random number between 1 and 5, as described above. Upon determining a new cycle threshold for die 0, the media management component 113 can reset the counter for die 0 to zero.

In embodiments, the media management component 113 can maintain a minimum size for the set of blocks (e.g., for the superblock or stripe 206). The minimum size for the set of blocks can help ensure that not too many blocks are skipped in the same program/erase cycle. Thus, prior to programming to a stripe 206, the media management component 113 can determine the size of the stripe 206. The size of the stripe 206 can be a count of the dies not excluded from the stripe 206. If the size of the stripe falls below a minimum size threshold, the media management component 113 can determine not to exclude certain blocks from the stripe 206. In some embodiments, prior to excluding a block from the set of blocks (e.g., stripe 206), the media management component 113 can determine that the size of the set of blocks satisfies a size criterion, and thus excluding a block from the set of blocks would result in an updated set of blocks that falls below the minimum size. Thus, if the size of the set of blocks satisfies the size criterion, the media management component 113 can include the block in the set of blocks, even though the counter value for the die on which the block resides matches the cycle threshold for the die. In embodiments, the media management component 113 can then leave the counter value unaltered so that the blocks residing on the die will be excluded in the next program/erase cycle (i.e., the next time the set of blocks is selected, the counter value will once again match the cycle threshold).

Figure 3:
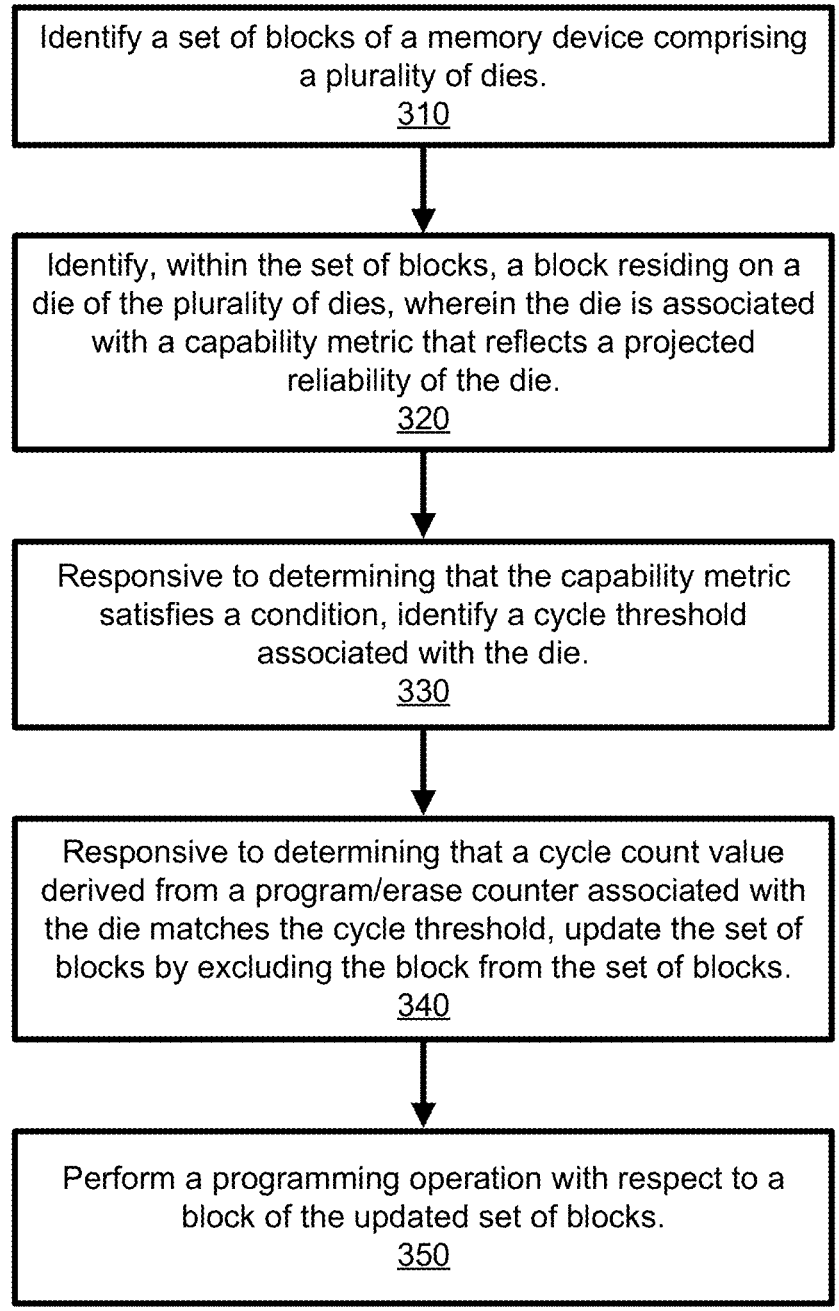
FIG. 3 is a flow diagram of an example method to implement adaptive wear leveling by excluding a block from a set of blocks, in accordance with some embodiments of the present disclosure.

FIG. 3 is a flow diagram of an example method 300 to implement adaptive wear leveling by excluding a block from a set of blocks, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic identifies a set of blocks of a memory device comprising a plurality of dies. The memory device can be, for example, memory device 130 of FIG. 1. The set of blocks can be a superblock, or a RAIN stripe, for example. The processing logic can identify a set of blocks to program in response to a triggering event. For example, the triggering event can be initiation of a garbage collection operation.

At operation 320, the processing logic identifies, within the set of blocks, a block residing on a die, wherein the die is associated with a capability metric that reflects a projected reliability of the die. The projected reliability of the die can be, for example, an endurance capability score, or a data retention capability score. The projected reliability can be determined during manufacturing of the memory device, and/or during operation of the memory device. In embodiments, during operation of the memory device, the processing logic can identify an error rate for the die, such a raw bit error rate or a codeword error rate. The processing logic can then update the capability metric based on the identified error rate for the die.

At operation 330, responsive to determining that the capability metric satisfies a condition, the processing logic identifies a cycle threshold associated with the die. The processing logic compares the capability metric to a defined capability threshold. In embodiments, the defined capability threshold represents the capability metric of the highest performing dies in the memory device. In some embodiments, processing logic can assign the dies of the memory device to a bin, according to each die's corresponding capability metric. Each bin can have a corresponding average cycle threshold, and each die in the bin can have a corresponding cycle threshold based on the average cycle threshold.

In embodiments, the average cycle threshold can be the defined capability threshold divided by the defined capability threshold minus the corresponding capability score (i.e., defined capability threshold÷(defined capability threshold−corresponding capability score)). The cycle threshold can be a random number between a minimum value and a maximum value. The minimum value can be 1, and the maximum value can be twice the average cycle threshold minus 1 (i.e., maximum value=2×average cycle threshold−1). The processing logic can determine an average cycle threshold for each die of a memory device for which the corresponding capability metric falls below the defined capability threshold. In embodiments, the processing logic can determine an average cycle threshold for each die assigned to a capability bin that is not the highest capability bin. The processing logic can determine a cycle threshold for a die at device manufacturing, and/or responsive to a power-on event. The processing logic can determine an updated cycle threshold for a die in response to determining that the cycle count value associated with the die matches the cycle threshold.

At operation 340, responsive to determining that a value of a cycle count value derived from a program/erase cycle counter associated with the die matches the cycle threshold, the processing logic updates the set of blocks by excluding the block from the set of blocks. Excluding the block from the set of blocks can include determining not to perform an erase operation on the block, not to store data on the block, and/or excluding the block in an XOR parity calculation. Responsive to determining that the cycle count value matches the cycle threshold, the processing logic resets the cycle count value associated with the die to zero, and determines an updated cycle threshold associated with the die (i.e., a new random number between the minimum value be 1 and the maximum number of twice the average cycle threshold for the die minus 1).

In embodiments, the processing logic maintains a cycle counter for each die in the memory device. The cycle counter can be derived from the program/erase cycle counter of the die. The counter starts at zero, and the processing logic increments the cycle count value by 1 responsive to determining that the cycle count value does not match the cycle threshold. That is, the processing logic increments the cycle counter value by 1 each time a program/erase cycle is performed on the die. When the cycle count value associated with the die matches the cycle threshold, the block residing on the die is not included in the current program/erase cycle, and the processing logic resets the cycle count value to zero.

In embodiments, the processing logic determines whether a size of the set of blocks satisfies a size criterion. The set of blocks is updated by excluding the block from the set of blocks responsive to determining that the size of the set of blocks satisfies the size criterion. That is, the processing logic excludes the block from the set of blocks responsive to determining that the set of blocks is greater than or equal to a size threshold value. This avoids excluding too many blocks from the set of blocks, thus ensuring that the set of blocks satisfies a minimum size requirement.

At operation 350, the processing logic performs a programming operation with respect to a block of the updated set of blocks. That is, the processing logic can use the updated set of blocks to perform programming operations.

In embodiments, the updated set of blocks can be erased, and the processing logic can then write data to a block of the updated set of blocks.

Figure 4:
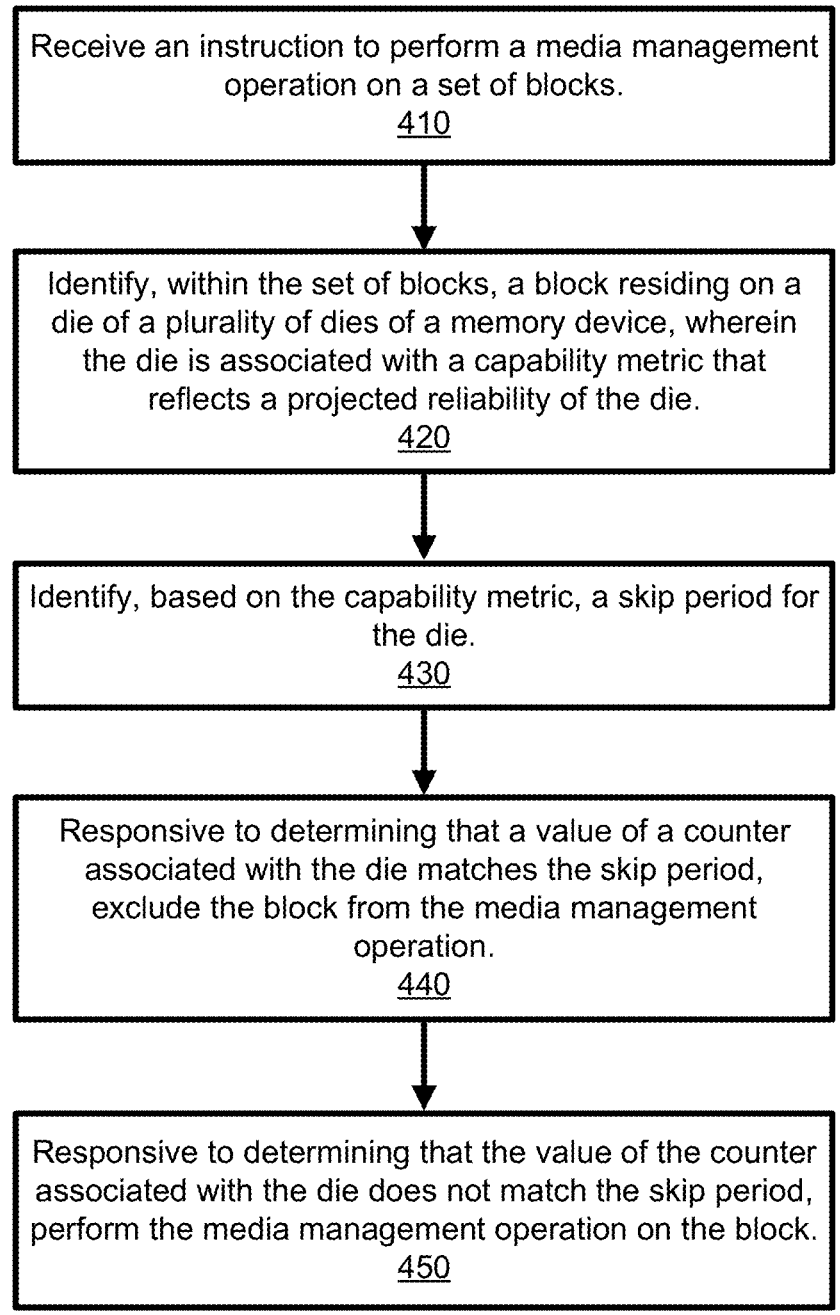
FIG. 4 is a flow diagram of an example method to implement adaptive wear leveling by excluding a block from a media management operation, in accordance with some embodiments of the present disclosure.

FIG. 4 is a flow diagram of an example method 400 to implement adaptive wear leveling by excluding a block from a media management operation, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives an instruction to perform a media management operation on a set of blocks. The set of blocks can be a superblock, or a RAIN stripe, for example. The media management operation can be an erase operation as part of a program/erase cycle, a wear leveling operation, a garbage collection operation, or some other media management operation.

At operation 420, the processing logic identifies, within the set of blocks, a block residing on a die of a plurality of dies of a memory device. The die is associated with a capability metric that represents a projected reliability of the die. The projected reliability of the die can be an endurance capability score, or a data retention capability score, for example. The projected reliability can be determined during manufacturing of the memory device, and/or during operation of the memory device. In embodiments, during operation of the memory device, the processing logic can identify an error rate for the die, such a raw bit error rate or a codeword error rate. The processing logic can then update the capability metric based on the identified error rate for the die.

At operation 430, the processing logic identifies, based on the capability metric, a cycle threshold of the die. In embodiments, the processing logic compares the capability metric to a defined capability threshold. In embodiments, the defined capability threshold represents the capability metric of the highest performing dies in the memory device. In some embodiments, processing logic can assign the dies of the memory device to a bin, according to each die's corresponding capability metric. Each bin can have a corresponding average cycle threshold, and each die in the bin can have a corresponding cycle threshold based on the average cycle threshold.

In embodiments, the average cycle threshold can be the defined capability threshold divided by the defined capability threshold minus the corresponding capability score (i.e., defined capability threshold=(defined capability threshold−corresponding capability score)). The cycle threshold can be a random number between a minimum value and a maximum value. The minimum value can be 1, and the maximum value can be twice the average cycle threshold minus 1 (i.e., maximum value=2×average cycle threshold−1). The processing logic can determine an average cycle threshold for each die of a memory device for which the corresponding capability metric falls below the defined capability threshold. In embodiments, the processing logic can determine an average cycle threshold for each die assigned to a capability bin that is not the highest capability bin. The processing logic can determine a cycle threshold for a die at device manufacturing, and/or responsive to a power-on event. The processing logic can determine an updated cycle threshold for a die in response to determining that the cycle count value associated with the die matches the cycle threshold.

At operation 440, responsive to determining that a value of a cycle count value derived from a program/erase cycle counter associated with the die matches the cycle threshold, the processing logic excludes the block from the media management operation. That is, the processing logic excludes the block from the set of blocks. Additionally, the processing logic resets the cycle count value to zero.

At operation 450, responsive to determining that the value of the cycle count value derived from a program/erase cycle counter associated with the die does not match the cycle threshold, the processing logic performs the media management operation on the block. Additionally, the processing logic increments the cycle count value by 1.

In embodiments, the processing logic determines a number of skipped blocks in the set of blocks. The skipped blocks are the blocks for which the corresponding cycle count value matches the corresponding cycle threshold (i.e., the number of blocks excluded from the set of blocks). The processing logic determines a size of the set of blocks not including the number of skipped blocks. Responsive to determining that the size is less than a minimum size threshold, the processing logic performs the media management operation on the block.

Figure 5:
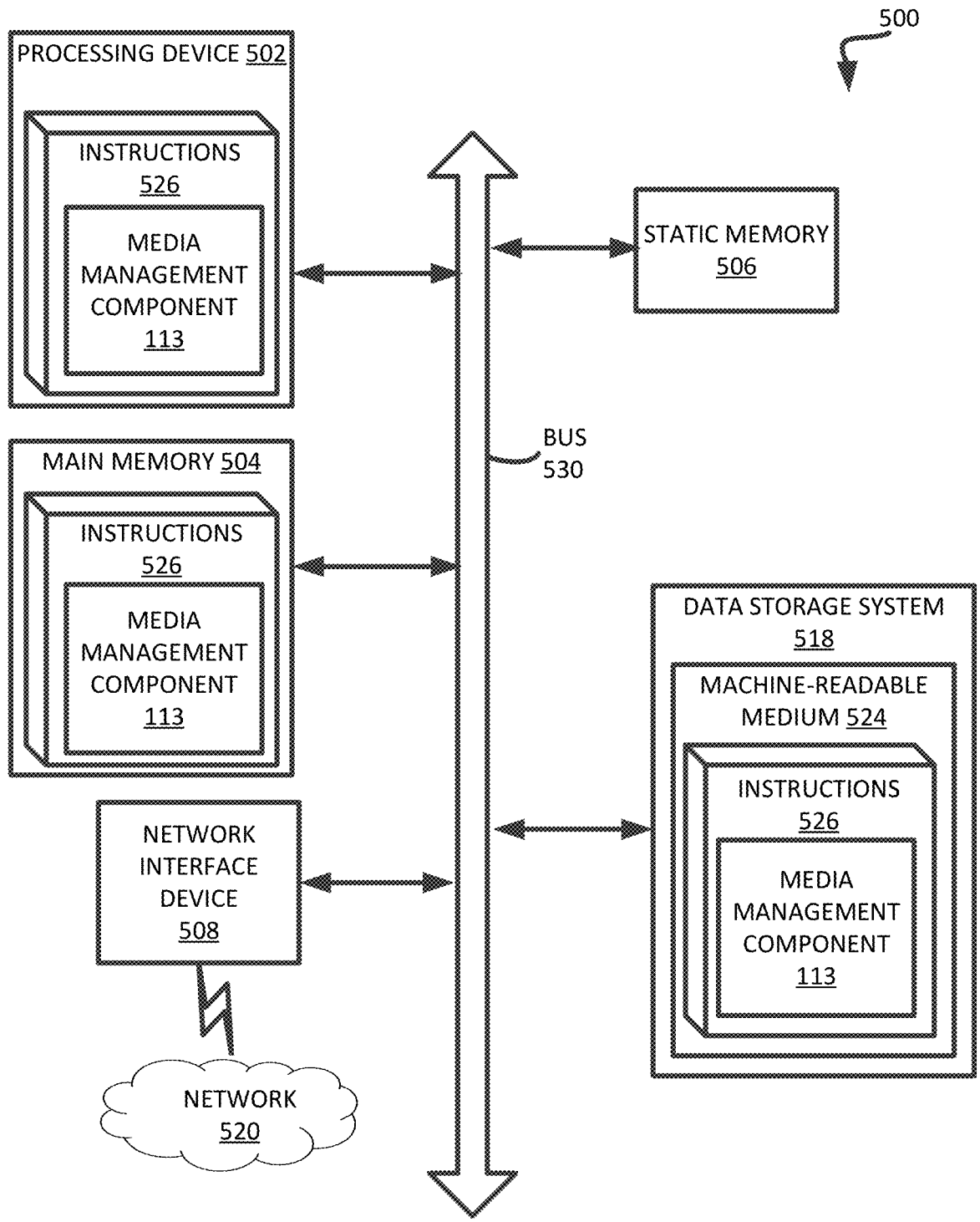
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a media management component (e.g., the media management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device; and
    a processing device, operatively coupled with the memory device, to perform operations comprising:
        identifying a first block of a set of blocks of the memory device;
        identifying, among a plurality of dies of the memory device, a die on which the first block resides;
        selecting, from a range associated with a projected reliability metric of the die, a threshold value associated with the die, wherein the range is defined by a minimum value and a maximum value that are correlated to the projected reliability metric of the die; and
        responsive to determining that an endurance metric value associated with the die matches the threshold value, performing a programming operation with respect to a second block of the set of blocks.

2. The system of claim 1, wherein responsive to determining that the endurance metric value associated with the die matches the threshold value, the operations further comprise:
    resetting the endurance metric value; and
    determining an updated threshold value associated with the die.

3. The system of claim 1, wherein the operations further comprise:
    responsive to determining that the endurance metric value associated with the die does not match the threshold value, incrementing the endurance metric value.

4. The system of claim 1, wherein the operations further comprise:
    determining, based on a defined capability threshold and the projected reliability metric, an average threshold value; and
    determining, based on the average threshold value, the threshold value for the die.

5. The system of claim 1, wherein the operations further comprise:
    responsive to determining that a size of the set of blocks satisfies a size criterion, updating the set of blocks by excluding the first block from the set of blocks.

6. The system of claim 5, wherein excluding the first block from the set of blocks comprises determining not to perform an erase operation on the first block.

7. The system of claim 5, wherein excluding the first block from the set of blocks comprises excluding the first block in an XOR parity calculation.

8. The system of claim 1, wherein the projected reliability metric of the die comprises at least one of: an endurance capability score or a data retention capability score.

9. A method comprising:
    identifying, by a processing device, a first block of a set of blocks of a memory device;
    identifying, among a plurality of dies of the memory device, a die on which the first block resides
    selecting, from a range associated with a projected reliability metric of the die, a threshold value associated with the die, wherein the range is defined by a minimum value and a maximum value that are correlated to the projected reliability metric of the die; and
    responsive to determining that an endurance metric value associated with the die matches the threshold value, performing a program operation with respect to a second block of the set of blocks.

10. The method of claim 9, wherein responsive to determining that the endurance metric value associated with the die matches the threshold value, the method further comprises:
    resetting the endurance metric value; and
    determining an updated threshold associated with the die.

11. The method of claim 9, further comprising:
    responsive to determining that the endurance metric value associated with the die does not match the threshold value, incrementing the endurance metric value.

12. The method of claim 9, further comprising:
   determining, based on a defined capability threshold and the projected reliability metric, an average threshold value; and
   determining, based on the average threshold value, the threshold value for the die.

13. The method of claim 9, further comprising:
   responsive to determining that a size of the set of blocks satisfies a criterion, updating the set of blocks by excluding the first block from the set of blocks.

14. The method of claim 13, wherein excluding the first block from the set of blocks comprises at least one of: determining not to perform an erase operation on the first block, or excluding the first block from an XOR parity calculation.

15. The method of claim 9, wherein the projected reliability metric of the die comprises at least one of: an endurance capability score or a data retention capability score.

16. A non-transitory computer-readable storage medium comprising instructions that, when executed by a processing device, cause the processing device to perform operations comprising:
   identifying a first block of a set of blocks of a memory device;
   identifying, among a plurality of a dies of the memory device, a die on which the first block resides;
   selecting, from a range associated with a projected reliability metric of the die, a threshold value associated with the die, wherein the range is defined by a minimum value and a maximum value that are correlated to the projected reliability metric of the die; and
   responsive to determining that an endurance metric value associated with the die matches the threshold value, performing a programming operation with respect to a second block of the set of blocks.

17. The non-transitory computer-readable storage medium of claim 16, wherein responsive to determining that the endurance metric value associated with the die matches the threshold value, the operations further comprise:
   resetting the endurance metric value; and
   determining an updated threshold value associated with the die.

18. The non-transitory computer-readable storage medium of claim 16, further comprising:
   responsive to determining that the endurance metric value associated with the die does not match the threshold value, incrementing the endurance metric value.

19. The non-transitory computer-readable storage medium of claim 16, further comprising:
   determining, based on a defined capability threshold and the projected reliability metric, an average threshold value; and
   determining, based on the average threshold value, the threshold value for the die.

20. The non-transitory computer-readable storage medium of claim 16, further comprising:
   responsive to determining that a size of the set of blocks satisfies a size criterion, updating the set of blocks by excluding the first block from the set of blocks.

* * * * *